(No Model.)

A. L. TUCKER.
FLEXIBLE CONDUIT.

No. 584,428.  Patented June 15, 1897.

Witnesses:

Inventor:
Albert L. Tucker,
By Barton & Brown
Attorneys.

United States Patent Office.

ALBERT L. TUCKER, OF CHICAGO, ILLINOIS, ASSIGNOR TO THE WESTERN ELECTRIC COMPANY, OF SAME PLACE.

FLEXIBLE CONDUIT.

SPECIFICATION forming part of Letters Patent No. 584,428, dated June 15, 1897.

Application filed October 23, 1896. Serial No. 609,848. (No model.)

*To all whom it may concern:*

Be it known that I, ALBERT L. TUCKER, a citizen of the United States, residing at Chicago, in the county of Cook and State of Illinois, have invented a certain new and useful Improvement in Flexible Conduits, (Case No. 4,) of which the following is a full, clear, concise, and exact description, reference being had to the accompanying drawings, forming a part of this specification.

My invention relates to flexible conduits for electrical conductors; and its object is to provide an insulating-conduit which may be flexed in any direction and which is also cheap to manufacture.

Conduits which possess a limited degree of flexibility have heretofore been made in which the lining of the conduit is composed of a spiral winding of paper. My invention is an improvement upon a conduit so constructed, and it will be more readily understood by reference to the accompanying drawings, in which—

Figure 1:
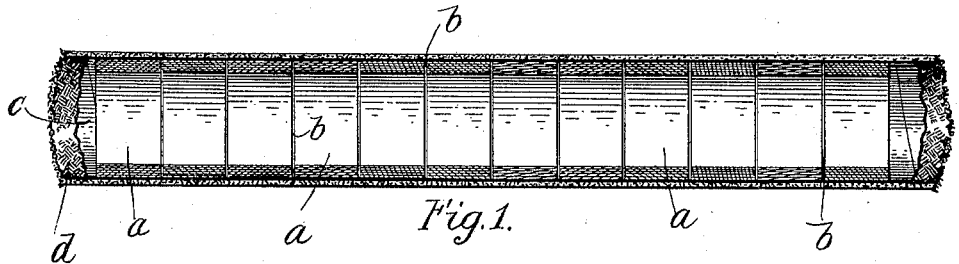
Figure 2:
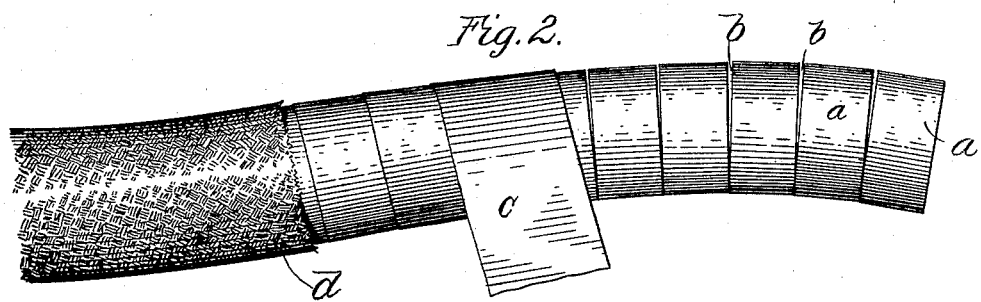
Figure 3:
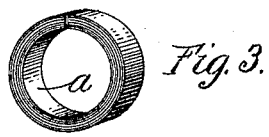

Figure 1 is a sectional view of a piece of conduit made in accordance with my invention. Fig. 2 is a view of a piece of conduit flexed and with the outside wrappings partially removed. Fig. 3 represents one of the paper sections which compose the lining of the conduit.

The same letters of reference are used to designate the same parts in the different views.

In my preferred form of construction I build up the lining of the conduit by forming the annular paper section $a$ of several layers of paper. These paper sections are placed end to end with small intervals $b\ b$ between them, as shown in Fig. 1. Around the sections is wound spirally a layer of tape $c$, preferably of the adhesive kind, and upon the tube thus formed I braid a covering $d$, which I prefer in practice to coat with an insulating compound to which powdered mica is added to facilitate the handling of the conduit. I am able to bend the conduit thus made upon a circle of very small radius and in any direction with equal facility. The covering to the lining yields sufficiently to conform to the curve of the lining. When the conduit is bent, the paper sections press together on one side and spread apart on the other side, as is shown in Fig. 2.

My conduit is primarily designed to provide ways for interior winding and is useful where the paths for the wires are obliged to depart from a straight line to avoid beams or other obstructions. I thus avoid elbows and abrupt turns, which occur with a rigid conduit.

It is obvious that modifications of the particular form here shown may be employed which, nevertheless, employ the essential features of my invention.

Having thus described my invention, what I claim as new, and desire to secure by Letters Patent, is—

1. In a flexible conduit, the combination with a lining composed of annular sections of a spiral winding of tape inclosing said annular sections, substantially as described.

2. In a flexible conduit the combination with a lining composed of annular sections of a spiral winding of tape, inclosing said annular sections, and a braided exterior covering, substantially as described.

3. In a flexible conduit the combination with a lining composed of rings of stiff material separated by small spaces, of a flexible envelop surrounding said lining, and a coating of insulating compound and powdered mica, substantially as described.

4. In a flexible conduit the combination with a lining composed of annular sections of a spiral winding of insulating-tape inclosing said annular sections and a braided exterior covering, treated with a coating of insulating compound and powdered mica, substantially as described.

5. In a flexible conduit the combination with the lining composed of paper rings or cylinders $a$, between which are the spaces $b\ b$, of the spiral winding of insulating-tape $c$ and the braided covering $a$, substantially as described.

In witness whereof I hereunto subscribe my name this 23d day of September, A. D. 1896.

ALBERT L. TUCKER.

Witnesses:
CHARLES A. BROWN,
D. W. C. TANNER.